(12) United States Patent
Horita et al.

(10) Patent No.: US 6,728,191 B1
(45) Date of Patent: Apr. 27, 2004

(54) DISK LOADING APPARATUS WITH INDEPENDENT DETECTION DEVICES

(75) Inventors: Yuji Horita, Ehime (JP); Tsuyoshi Hashida, Ehime (JP); Shinichi Wada, Ehime (JP); Makoto Maruoka, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/890,068

(22) PCT Filed: Jan. 25, 2000

(86) PCT No.: PCT/JP00/00365

§ 371 (c)(1),
(2), (4) Date: Oct. 4, 2001

(87) PCT Pub. No.: WO00/45384

PCT Pub. Date: Aug. 3, 2000

(30) Foreign Application Priority Data

Jan. 27, 1999 (JP) .................................. 11-018876

(51) Int. Cl.$^7$ ............................................. G11B 17/04
(52) U.S. Cl. ..................................................... 369/77.1
(58) Field of Search ............................. 369/77.1, 75.2

(56) References Cited

U.S. PATENT DOCUMENTS

| 4,627,042 A | 12/1986 | Hara |
| 4,628,498 A | * 12/1986 | Takamatsu et al. ........ 369/77.1 |
| 5,195,077 A | * 3/1993 | Ishikawa et al. ........... 369/75.2 |
| 5,224,079 A | 6/1993 | Inoue |
| 5,260,925 A | * 11/1993 | Camps et al. ............... 369/77.1 |
| 5,719,844 A | 2/1998 | Abe ........................... 369/77.1 |

FOREIGN PATENT DOCUMENTS

| JP | 63-048650 | * 3/1988 | ........... G11B/17/04 |
| JP | 5-144151 | 6/1993 | |
| KR | 1991-0003047 | 5/1991 | |
| KR | 1991-0014906 | 8/1991 | |

OTHER PUBLICATIONS

Sasaki et al. JP 05–144151, English Translation.*

* cited by examiner

Primary Examiner—George J. Letscher
Assistant Examiner—C R Beacham
(74) Attorney, Agent, or Firm—Wenderoth, Lind & Ponack, L.L.P.

(57) ABSTRACT

Provided in the vicinity of both sides of a disk loading slot, are rods which rotate when contacted by a disk that is loaded, and disk check levers which are in contact with the rods and rotate by a principle of a lever. With such a disk loading apparatus, when loading a disk into a reproduction apparatus, incorrect loading of a disk due to a difference in disk sizes is prevented.

4 Claims, 9 Drawing Sheets

DISK LOADING APPARATUS WITH INDEPENDENT DETECTION DEVICES

TECHNICAL FIELD

The present invention relates to a disk loading apparatus as a mechanism for loading a disk into a disk driving apparatus and, more particularly, to a mechanism for preventing incorrect loading of a disk with an improper diameter.

BACKGROUND ART

A conventional disk loading device in a disk driving apparatus aims to load a 12 cm disk correctly into the disk driving apparatus without scratching or contaminating a surface of the disk, as can be seen in a loading system employing a driving roller type, or in a belt-driven type, loading system which is generally adopted in a vehicle-mounted disk driving apparatus, as disclosed in, for example, Japanese Published Utility Model Application No. 62-63854.

The driving roller type or belt-driven type loading system for correctly loading a disk into a disk driving apparatus without scratching or contaminating the disk surface, is targeted for 12 cm disks. As for disks having diameters smaller than 12 cm, a countermeasure against a failure of the disk driving apparatus due to incorrect loading of the smaller-diameter disks has been taken by indicating precautions or the like. Accordingly, incorrect loading of smaller-diameter disks due to a user's forgetting about reading the precautions, carelessness, or the like has caused a failure of a disk driving apparatus.

Conventional disk loading devices are constituted as described above, and incorrect loading of disks having sizes different from a prescribed size causes a failure of a disk driving apparatus.

The present invention is made to solve the above-described problem and has for its object to provide a disk loading apparatus which can reliably prevent loading of smaller-diameter disks, due to carelessness or the like, to prevent a failure of a disk driving apparatus, even when a countermeasure against incorrect loading of smaller-diameter disks, such as indication of precautions, is not taken.

SUMMARY OF THE INVENTION

A disk loading apparatus according to a first aspect of the present invention comprises two independent disk loading detection devices which are provided in the vicinity of a disk loading slot, and are operated together when a disk having a predetermined size is loaded; and two disk loading control devices which are provided in a carrier path of the disk, independently from each other and corresponding to the two disk loading detection devices, respectively, and are operated in connection with the disk loading detection devices to provide a disk-carrying enabled state and a disk-carrying disabled state of the carrier path.

As described above, the disk loading apparatus according to the first aspect of the present invention is provided with two independent disk loading detection devices which are provided in the vicinity of a disk loading slot, and are operated together when a disk having a predetermined size is loaded; and two disk loading control devices which are provided in a carrier path of the disk, independently from each other and corresponding to the two disk loading detection devices, respectively, and are operated in connection with the disk loading detection devices to provide the disk-carrying enabled state and disk-carrying disabled state of the carrier path. Therefore, it is possible to provide a disk loading apparatus that can correctly load only a disk of an operable size into a disk driving apparatus, and can prevent incorrect loading of a disk having an improper size so as to avoid a failure of the disk driving apparatus, even when a countermeasure against incorrect loading of a smaller-diameter disk, such as indication of precautions or the like, is not taken.

Further, according to a second aspect of the present invention, in the disk loading apparatus defined in accordance with the first aspect, the two disk loading detection devices include rods which rotate in accordance with insertion/ejection of a disk, about certain pivot axes, along a disk insertion/ejection direction; the disk loading control devices include levers which have edges in contact with the rods, respectively, and rotate about certain pivot axes in a direction intersecting the disk insertion/ejection direction, whereby upper and lower positions of the levers are changed with the carrier path as a reference plane; and when a disk which is smaller than a disk of a predetermined size is loaded, at least one of the levers intersects the carrier path.

As described above, according to the second aspect of the invention, in the disk loading apparatus as defined in the first aspect, the two disk loading detection devices include rods which rotate in accordance with insertion/ejection of a disk, about certain pivot axes, along the disk insertion/ejection direction; the disk loading control devices include levers which have edges in contact with the rods, respectively, and rotate about certain pivot axes in a direction intersecting the disk insertion/ejection direction, whereby the upper and lower positions of the levers are changed with the carrier path as a reference plane; and, when a disk which is smaller than the disk of the predetermined size is loaded, at least one of the levers intersects the carrier path, whereby loading of a disk smaller than the disk of the predetermined size is prevented. Therefore, it is possible to provide a disk loading apparatus that can correctly load only a disk of a predetermined operable size into a disk driving apparatus, and can prevent incorrect loading of a disk having an improper size smaller than the predetermined size so as to avoid a failure of the disk driving apparatus, even when a countermeasure against incorrect loading of the smaller-diameter disk, such as indication of precautions or the like, is not taken.

BRIEF DIESCRIPTION OF THE DRAWINGS

FIGS. 6(*a*)–6(*d*) show diagrams for explaining the operation of a disk loading apparatus according to the first embodiment in a case where an 8 cm disk is loaded so as to be positioned a little right with respect to the center of the disk loading device.

FIGS. 7(*a*)–7(*c*) show enlarged views of neighborhoods of roller rods and disk check levers shown in FIGS. 6(*a*)–6(*d*).

FIGS. 8(*a*)–8(*d*) show diagrams for explaining the operation of the disk loading apparatus according to the first embodiment in a case where an 8 cm disk is loaded so as to be positioned centrally of the disk loading apparatus.

FIGS. 9(*a*) and 9(*b*) show enlarged views of neighborhoods of roller rods and disk check levers shown in FIGS. 8(*a*)–8(*d*).

DETAILED DESCRIPTION OF THE PREFERRED EMBODIMENTS

Embodiment 1

Figure 1:
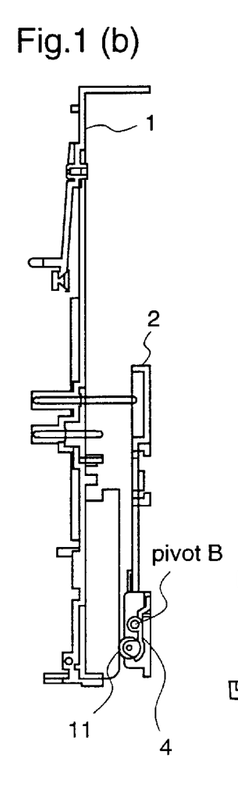
FIGS. 1(a)–1(d) show a plan view, elevation views of both sides, and a front view of a disk loading side, of a disk loading apparatus according to a first embodiment of the present invention.

Hereinafter, a disk loading apparatus according to a first embodiment of the present invention will be described with reference to FIGS. 1(*a*) to 5(*c*). FIGS. 1(*a*)–1(*d*) show a top surface, left and right sides, and a side having a disk loading slot, of a disk loading apparatus according to the present invention. In the figures, numeral 1 denotes a mechanical chassis on which parts such as a substrate, a spindle motor and the like are mounted, and numeral 2 denotes a loading chassis which is arranged on the mechanical chassis 1 so as to be opposed to the chassis 1, and is provided with a mechanism for performing loading of a disk 9. Further, numerals 3 and 4 denote roller rods which are rotatable on pivots A and B, respectively, and the roller rods 3 and 4 are provided with, at their edges, rollers 11 that rotate when contacted by a surface of the disk 9 when the disk 9 is loaded, while other edges 3A and 4A of the roller rods hang over edges of disk check levers, which will be described later, to be engaged with the edges of the disk check levers. Further, numerals 5 and 6 denote the disk check levers which are rotatable on pivots C and D, respectively, and edges 5A and 6A of the disk check levers are positioned beneath the edges 3A and 4A of the roller rods 3 and 4, respectively, while other edges 5B and 6B of the disk check levers protrude toward a center of the disk 9. According to a lever operation by engagement of the roller rod 3 and the disk check lever 5 and engagement of the roller rod 4 and the disk check lever 6, a diameter of a disk loaded from a front panel 10 side is determined, whereby loading of a disk of an improper size is prevented.

Figure 2:
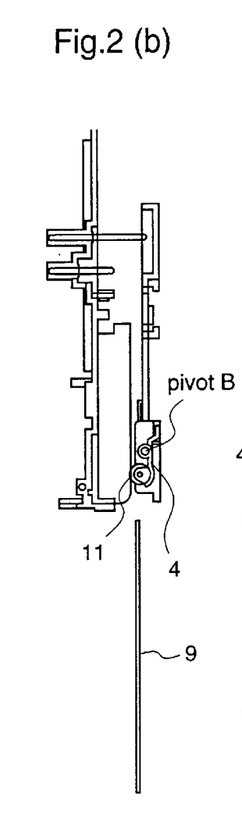
FIGS. 2(a)–2(d) show diagrams for explaining operation of the disk loading apparatus according to the first embodiment in a case where a 12 cm disk is loaded.
Figure 3:
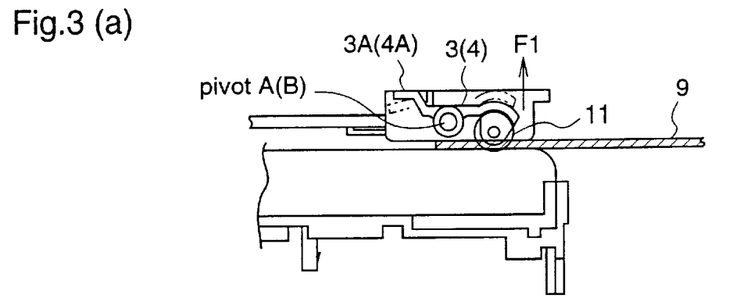
FIGS. 3(a) and 3(b) show enlarged views of neighborhoods of roller rods and disk check levers shown in FIGS. 2(a)–2(d).

Next, operation will be described. FIGS. 2(*a*)–2(*d*) illustrate a state where a 12 cm disk is loaded in FIG. 1. Further, FIGS. 3(*a*) and 3(*b*) show enlarged views of neighborhoods of the roller rods and the disk check levers shown in FIGS. 2(*a*)–2(*d*). As shown in FIG. 3(*a*), when a 12 cm disk 9 is loaded, the 12 cm disk 9 pushes up the rollers 11, which are supported by edges of the roller rods 3 and 4, in a direction of arrow F1, and the roller rods 3 and 4 rotate counterclockwise on the pivots A and B, respectively. Thereby, as shown in FIG. 3(*b*), the other edge 3A of the roller rod 3 pushes down the edge 5A of the disk check lever 5 in a direction of arrow F2 while the other edge 4A of the roller rod 4 pushes down the edge 6A of the disk check lever 6 in the direction of arrow F2, and the disk check lever 5 rotates clockwise on the pivot C while the disk check lever 6 rotates counterclockwise on the pivot D, whereby the other edge 5B of the disk check lever 5 and the other edge 6B of the disk check lever 6 are moved from a disk loading preventing position A to a position B so as to provide a slot through which the disk can pass, thereby enabling loading of the 12 cm disk.

Figure 4:
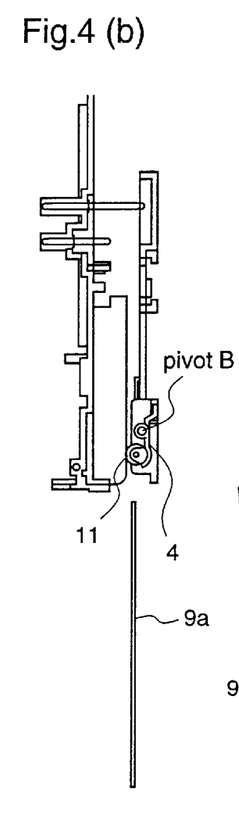
FIGS. 4(a)–4(d) show diagrams for explaining the operation of the disk loading apparatus according to the first embodiment in a case where an 8 cm disk is loaded so as to be positioned a little left with respect to a center of the disk loading apparatus.
Figure 5:
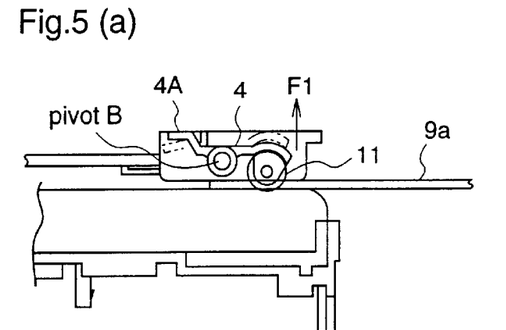
FIGS. 5(a)–5(c) show enlarged views of neighborhoods of roller rods and disk check levers shown in FIGS. 4(a)–4(d).

Next, a description will be given of the operation of the disk loading apparatus shown in FIGS. 1(*a*)–1(*d*) in a case where an 8 cm disk is loaded from a left side with respect to a center of the disk loading apparatus, with reference to FIGS. 4(*a*)–5(*c*). As shown in FIGS. 4(*a*), 4(*b*), 4(*c*) and 4(*d*), when a disk 9a having a diameter of 8 cm is loaded so as to be positioned a little (toward the disk check lever 6) with respect to the center of the disk loading apparatus device, the 8 cm disk 9a pushes up the roller 11, which is supported by an edge of the roller rod 4, in a direction of arrow F1 as shown in FIG. 5(*a*), whereby the roller rod 4 rotates counterclockwise on the pivot B. Thereby, as shown in FIG. 5(*c*), the other edge 4A of the roller rod 4 pushes down the edge 6A of the disk check lever 6 in a direction of arrow F2, and the disk check lever 6 rotates counterclockwise on the pivot D, whereby the other edge 6B of the disk check lever 6 is moved from a disk loading preventing position A to a position B so as to provide a slot through which the disk passes.

On the other hand, as shown in FIG. 5(*b*), since the roller 11 supported by an edge of the roller rod 3 is not in contact with the disk 9a and is not pushed up by the disk 9a in a direction of arrow F2, the roller rod 3 does not rotate counterclockwise on the pivot A. Thereby, as shown in FIG. 5(*c*), the other edge 3A of the roller rod 3 does not push down the edge 5A of the disk check lever 5 in the direction of arrow F2, and the disk check lever 5 is maintained in an initial state, and the other edge 5B of the disk check lever 5 is maintained in disk loading preventing position A. Accordingly, the disk 9a comes into contact with the other edge 5B of the disk check lever 5, whereby loading of the 8 cm disk 9a is prevented.

Figure 6:
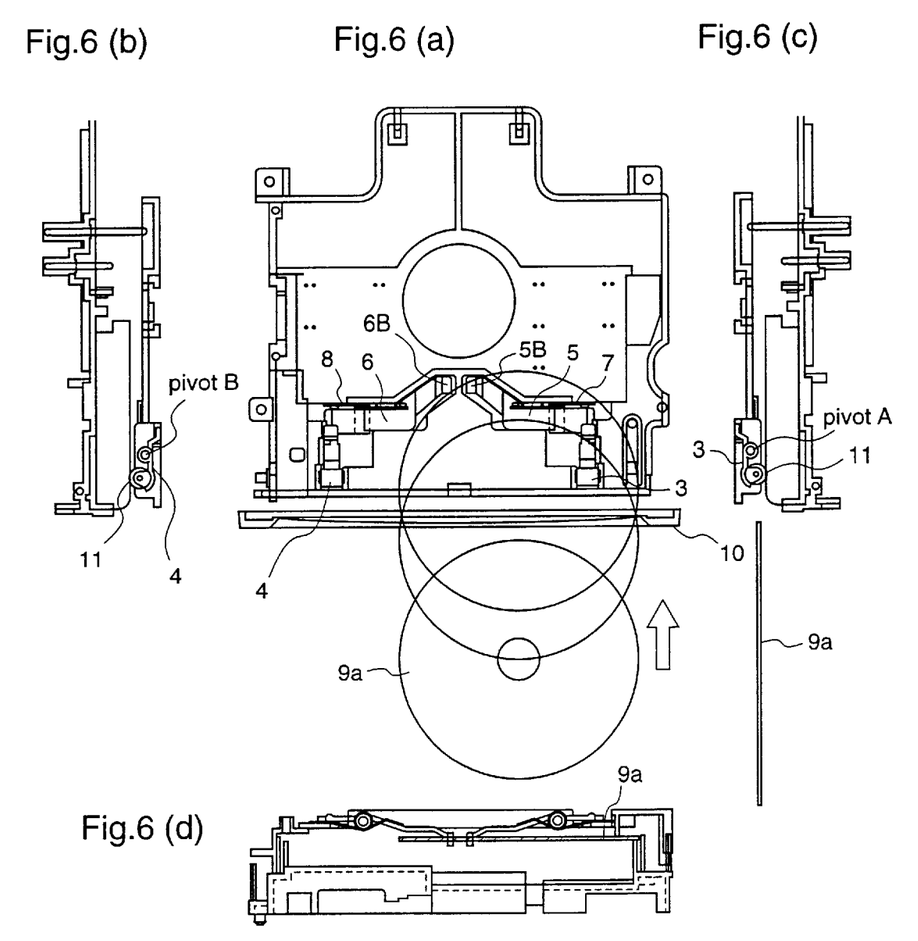
Figure 7:
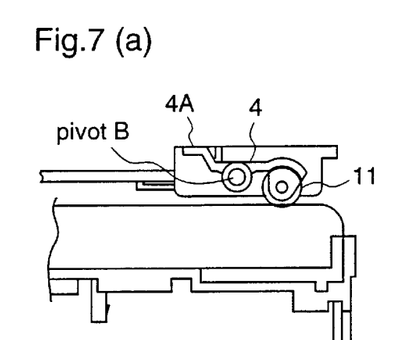

Further, FIGS. 6(*a*)–7(*c*) are diagrams for explaining operation of the disk loading apparatus in a case where a 8 cm disk 9a is loaded from a right side with respect to the center of the disk loading device. As shown in FIGS. 6(*a*), 6(*b*), 6(*c*) and 6(*d*), when the disk 9a having a diameter of 8 cm is loaded so as to be positioned a little right (toward the disk check lever 5) with respect to the center of the disk loading device, as shown in FIG. 7(*b*), when the 8 cm disk 9a is loaded, the 8 cm disk 9a pushes up the roller 11 which is supported by an edge of the roller rod 3, in a direction of arrow F1, whereby the roller rod 3 rotates counterclockwise on the pivot A. Thereby, as shown in FIG. 7(*c*), the other edge 3A of the roller rod 3 pushes down the edge 5A of the disk check lever 5 in a direction of arrow F2, and the disk check lever 5 rotates clockwise on the pivot C, whereby the other edge 5B of the disk check lever 5 is moved from the disk loading preventing position A to position B so as to provide a slot through which the disk passes.

On the other hand, as shown in FIG. 7(*a*), since the roller 11 supported by an edge of the roller rod 4 is not in contact with the disk 9a and is not pushed up by the disk 9a in a direction of arrow F1, the roller rod 4 does not rotate counterclockwise on the pivot B. Thereby, as shown in FIG. 7(*c*), the other edge 4A of the roller rod 4 does not push down the edge 6A of the disk check lever 6 in a direction of arrow F2, and the disk check lever 6 is maintained in an initial state, and the other edge 6B of the disk check lever 6 is maintained in the disk loading preventing position A. Accordingly, the disk 9a comes into contact with the other edge 6B of the disk check lever 6, whereby loading of the 8 cm disk 9a is prevented.

Figure 8:
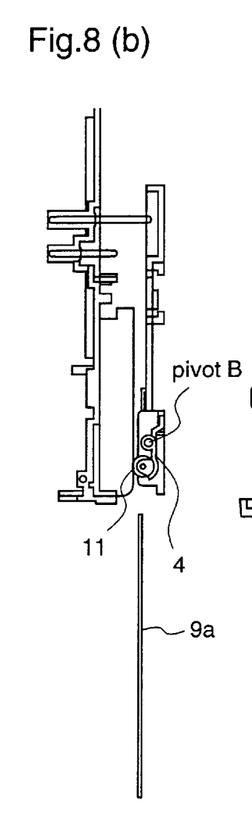
Figure 9:
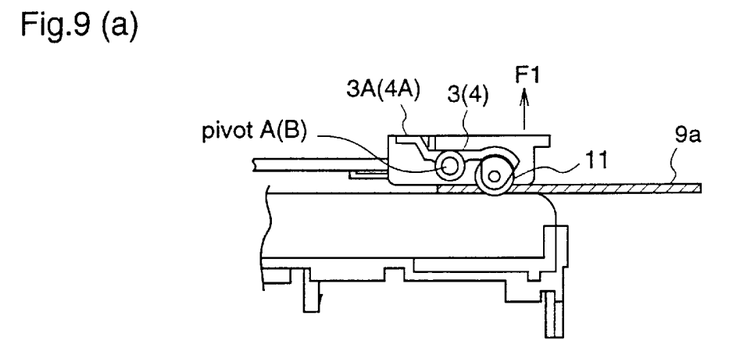

Further, FIGS. 8(*a*)–9(*b*) are diagrams for explaining operation of the disk loading apparatus in a case where an 8 cm disk 9a is centrally loaded with respect to the disk loading apparatus. As shown in FIGS. 8(a), 8(b), 8(c) and 8(d), when the disk 9a having a diameter of 8 cm is loaded so that a center of the disk 9a is positioned at a center of the disk loading apparatus, since, as shown in FIG. 9(a), the 8 cm disk 9a does not push up the rollers 11, which are supported by edges of the roller rod 3 and roller rod 4, in a direction of arrow F1, the roller rods 3 and 4 do not rotate on the respective pivots A and B. Therefore, as shown in FIG. 9(b), the other edge 3A of the roller rod 3 does not push down the edge 5A of the disk check lever 5 in a direction of arrow F2 while the other edge 4A of the roller rod 4 does not push down the edge 6A of the disk check lever 6 in a direction of arrow F2, and the other edge 5B of the disk check lever 5 and the other edge 6B of the disk check lever 6 are maintained in the disk loading preventing position A, whereby the disk 9a comes into contact with the other edge 5B of the disk check lever 5 and the other edge 6B of the disk check lever 6, and thus loading of the 8 cm disk 9a is prevented.

In this way, since the disk loading apparatus is constructed so that it prevents loading of the 8 cm disk 9a and permits loading of the 12 cm disk 9 only, a failure of the disk driving apparatus due to incorrect loading of the 8 cm disk 9a can be avoided.

As described above, according to the embodiment of the invention, the disk loading apparatus is provided with, in the vicinity of both sides of an opening as a disk loading slot, the roller rods 3 and 4 which rotate when contacted by a disk upon loading of the disk, and the disk check levers 5 and 6 which rotate when contacted by the rods 3 and 4 according to principle of levers, whereby, only when a disk of a predetermined size is loaded, the rods 3 and 4 are operated together to move the disk check levers 5 and 6 together from the disk loading preventing position A to position B, thereby enabling the disk to pass through the slot. On the other hand, when a disk smaller than a predetermined size is loaded, the disk does not come into contact with either or both of the rods 3 and 4, and at least one of the disk check levers 5 and 6 is maintained in the disk loading preventing position A to prevent the disk from passing through the slot. Therefore, the disk loading apparatus can automatically detect a difference in sizes of disks by simply loading the disks and, when a size of the disk is not a predetermined size, the apparatus can prevent the disk from being loaded into a disk driving apparatus.

APPLICABILITY IN INDUSTRY

As described above, the disk loading apparatus according to the present invention can correctly load only a disk having an operable size into a disk driving apparatus, and can prevent incorrect loading of a disk having an improper size to avoid a failure of the disk driving apparatus, even when a countermeasure against incorrect loading of a smaller-diameter disk is not taken by providing precautions or the like.

What is claimed is:

1. A disk loading apparatus, comprising:

two independent detection devices provided in the vicinity of a disk loading slot and arranged so as to be activated together when a disk having a predetermined size is passed through said disk loading slot, each of said two independent detection devices including a rod that is designed to pivot about a first axis in accordance with passage of the disk through said disk loading slot; and two independent disk loading control devices corresponding to said two independent detection devices, respectively, said two independent disk loading devices being provided along a carrier path for the disk and arranged to be activated in connection with activation of said two independent detection devices, respectively, so as to provide a disk-carrying enabled state of said carrier path and a disk-carrying disenabled state of said carrier path, each of said two independent disk loading control devices including a lever that is designed to pivot about a second axis from a first position at which said lever is in said carrier path to a second position at which said lever is not in said carrier path, such that upon pivoting of said rod of a corresponding one of said two independent detection devices, about said first axis, said lever pivots about said second axis to said second position, wherein the disk-carrying enabled state of said carrier path is realized when said lever of each of said two independent disk loading control devices is in the second position, and the disk-carrying disenabled state of said carrier path is realized when said lever of at least one of said two independent disk loading control devices is in the first position.

2. The disk loading apparatus according to claim 1, wherein said two independent disk loading control devices are constructed and arranged such that said rod of said corresponding one of said two independent detection devices, upon pivoting about said first axis, pivots said lever about said second axis by being in contact with said lever.

3. The disk loading apparatus according to claim 2, wherein each of said two independent detection devices further includes a roller at one end of said rod, such that said rod pivots about said first axis in response to the disk contacting said roller and moving said roller in a direction that is generally orthogonal to said carrier path.

4. The disk loading apparatus according to claim 1, wherein each of said two independent detection devices further includes a roller at one end of said rod, such that said rod pivots about said first axis in response to the disk contacting said roller and moving said roller in a direction that is generally orthogonal to said carrier path.

* * * * *